(No Model.)

J. SLADDIN.
OIL CUP.

No. 350,779. Patented Oct. 12, 1886.

Witnesses:
Walter E. Lombard
Charles K. Stearns

Inventor:
Joseph Sladdin,
by N. C. Lombard
Attorney.

UNITED STATES PATENT OFFICE.

JOSEPH SLADDIN, OF LAWRENCE, MASSACHUSETTS.

OIL-CUP.

SPECIFICATION forming part of Letters Patent No. 350,779, dated October 12, 1886.

Application filed April 26, 1886. Serial No. 200,192. (No model.)

*To all whom it may concern:*

Be it known that I, JOSEPH SLADDIN, of Lawrence, in the county of Essex and State of Massachusetts, have invented certain new and useful Improvements in Oil-Cups, of which the following, taken in connection with the accompanying drawings, is a specification.

My invention relates to oil-cups for lubricating revolving shafts and loose pulleys; and it consists in certain novel features of construction, arrangement, and combination of parts, which will be readily understood by reference to the description of the drawings, and to the claims to be hereinafter given.

Figure 1:
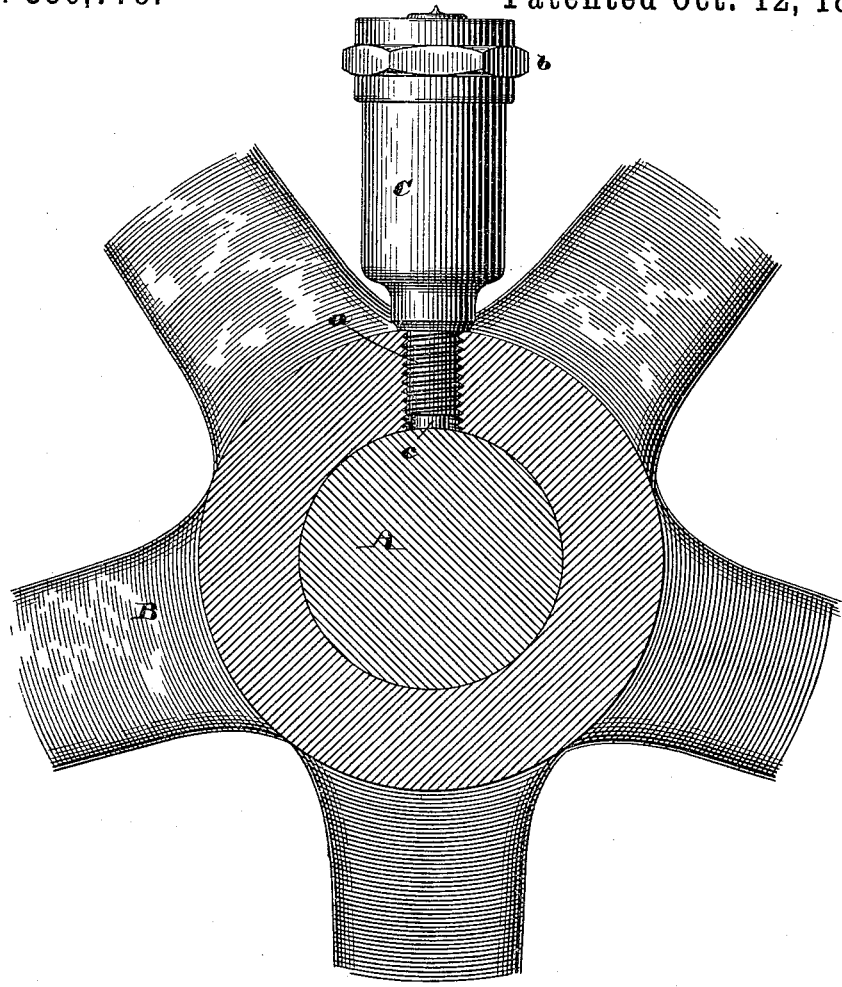
Figure 2:
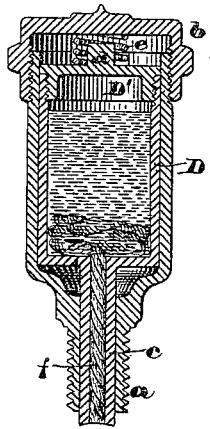

Figure 1 of the drawings is a transverse section of a shaft and a loose pulley mounted thereon, and showing my improved oil-cup in elevation; and Fig. 2 is a central vertical section of my improved oil-cup detached.

In the drawings, A is a shaft, upon which is mounted so as to revolve freely thereon the pulley B, the rim and portions of the arms of which are broken away, as being unnecessary to the proper illustration of my invention.

C is a cylindrical casing, provided at one end with the threaded tubular shank $a$, which is screwed into a threaded hole in the hub of the pulley B, and at the other end with the threaded cap $b$, all as shown in the drawings.

D is the oil-cup proper, fitted loosely within the casing C, and provided at one end with the tubular stem $c$, which extends through the shank $a$ of the casing C, so as to be freely movable endwise therein and rest upon the shaft A, as shown in Fig. 1.

The upper end of the oil-cup D is closed by the screw-cap D', provided with the upwardly-projecting stem $d$, to receive the spring $e$, which is interposed between said cap D' and the cap $b$ of the casing C, said spring having sufficient tension to support the weight of the oil-cup and its contents and maintain the end of the tubular stem $c$ in contact with the shaft in all positions which said oil-cup may assume during a revolution of the pulley B.

The hole through the stem $c$ may be packed with wicking, felt, or any other suitable absorbent material, as shown at $f$ in Fig. 2; or the packing may be dispensed with, so as to allow the oil to flow direct to the shaft, the size of the hole through the stem $c$ being proportioned to the amount of oil that it is desired to deliver to the shaft. The end of the stem $c$ is cut to fit the periphery of the shaft, upon which it bears lightly at all times, and the oil is delivered to the shaft with great regularity and just sufficient quantity to properly lubricate the pulley or shaft.

The same cup may be used with equal success upon a stationary bearing of a revolving shaft, and therefore I do not wish to be limited in its use to lubricating loose pulleys.

The casing C may have its walls perforated or made in the form of a skeleton frame, to support the cap $b$, which takes the thrust of the spring $e$, if desired, without affecting the principle of operation of my invention, and when used on a fixed bearing for lubricating a revolving shaft the casing and the spring $e$ may both be dispensed with.

In another application of mine filed April 26, 1886, and numbered 200,193, I have illustrated and described a modified form of this lubricator adapted to the lubrication of carriage-axles, but do not claim in said other application anything claimed in this application.

What I claim as new, and desire to secure by Letters Patent of the United States, is—

1. The combination of an oil-cup provided with a tubular discharge-stem rigidly connected thereto and arranged with its end in contact with and freely movable to and from a shaft or journal to be lubricated, a spring for pressing said oil-cup and stem toward said shaft or journal, and a stationary abutment to take the thrust of said spring, substantially as described.

2. The combination of the casing C, provided with the threaded tubular shank $a$ and the cap $b$, the oil-cup D, having the tubular discharge-stem $c$ rigidly connected thereto, and the spring $e$, all constructed, arranged, and adapted to operate substantially as and for the purposes described.

3. The combination of an oil-cup provided with a tubular discharge-stem integral therewith, a supporting and guiding socket, to which said tubular discharge-stem is loosely fitted, with its end in contact with a shaft or bearing to be lubricated, and freely movable to and from the same, and a packing of absorbent material fitting the passage from said oil-cup to the shaft, substantially as described.

In testimony whereof I have signed my name to this specification, in the presence of two subscribing witnesses, on this 24th day of April, A. D. 1886.

JOSEPH SLADDIN.

Witnesses:
N. C. LOMBARD,
WALTER E. LOMBARD.